United States Patent
Poncet et al.

(10) Patent No.: US 8,000,930 B2
(45) Date of Patent: Aug. 16, 2011

(54) MONITORING A DEGRADING SYSTEM

(75) Inventors: Andreas Poncet, Grandvaux (CH);
Konrad Stadler, Niederweningen (CH);
Thomas Von Hoff, Zürich (CH)

(73) Assignee: ABB Research Ltd, Zurich (CH)

( * ) Notice: Subject to any disclaimer, the term of this patent is extended or adjusted under 35 U.S.C. 154(b) by 612 days.

(21) Appl. No.: 12/076,852

(22) Filed: Mar. 24, 2008

(65) Prior Publication Data

US 2008/0201104 A1    Aug. 21, 2008

Related U.S. Application Data

(63) Continuation of application No. PCT/CH2006/000509, filed on Sep. 20, 2006.

(30) Foreign Application Priority Data

Sep. 22, 2005 (EP) .................................... 05405551

(51) Int. Cl.
| G06F 17/18 | (2006.01) |
| G06F 19/00 | (2011.01) |
| G06F 11/30 | (2006.01) |
| G06F 17/40 | (2006.01) |
| G21C 17/00 | (2006.01) |

(52) U.S. Cl. ........... 702/181; 702/34; 702/184; 702/185
(58) Field of Classification Search .................... 702/34, 702/181, 184, 185
See application file for complete search history.

(56) References Cited

U.S. PATENT DOCUMENTS

| 4,402,054 A | 8/1983 | Osborne et al. |
| 5,210,704 A * | 5/1993 | Husseiny ........................ 702/34 |
| 6,085,154 A | 7/2000 | Leuthausser et al. |
| 6,411,908 B1 | 6/2002 | Talbott |
| 7,062,370 B2 * | 6/2006 | Vhora et al. ................... 701/100 |
| 7,082,384 B2 * | 7/2006 | Sasaki et al. ................... 702/184 |
| 2003/0216888 A1 | 11/2003 | Ridolfo |
| 2004/0078167 A1 | 4/2004 | Tan et al. |

FOREIGN PATENT DOCUMENTS

| EP | 1 103 926 A2 | 5/2001 |
| EP | 1 418 481 A1 | 5/2004 |
| EP | 1 544 771 A1 | 6/2005 |
| EP | 1 705 542 A1 | 9/2006 |

OTHER PUBLICATIONS

International Search Report (PCT/ISA/210).
PCT/ISA/237—Written Opinion.

* cited by examiner

*Primary Examiner* — Michael P Nghiem
*Assistant Examiner* — Janet L Suglo
(74) *Attorney, Agent, or Firm* — Buchanan Ingersoll & Rooney PC

(57) ABSTRACT

The present disclosure is concerned with the identification of fault origins of slowly degrading systems such as industrial gas turbines. Following the initial input of some parameter values, exemplary procedure comprises a number of steps which are repeated periodically during the operation of the gas turbine. First, for each potential fault such as e.g. a contamination of compressor blades, erosion of turbine blades or corrosion of machine parts, a pre-symptom fault probability, characteristic of the specific gas turbine considered, and a symptom-conditional fault probability are calculated. In a second step, on-line data from the monitoring devices are loaded in order to update information about symptoms such as e.g. reductions in polytropic efficiency and in flow capacity, changes in vibration spectrum, or other machine condition indicators, and a post-symptom fault probability is calculated. In a third step, the calculated fault probabilities are displayed and transmitted to a planning system for scheduling of gas turbine operation or maintenance actions.

10 Claims, 2 Drawing Sheets

US 8,000,930 B2

MONITORING A DEGRADING SYSTEM

RELATED APPLICATION

This application claims priority under 35 U.S.C. §119 to EP Application 05405551.2 filed in Europe on Sep. 22, 2005, and as a continuation application under 35 U.S.C. §120 to PCT/CH2006/000509 filed as an International Application on Sep. 20, 2006 designating the U.S., the entire contents of which are hereby incorporated by reference in their entireties.

TECHNICAL FIELD

The disclosure relates to the field of control and instrumentation technology for turbomachines such as gas turbines or internal combustion engines. It departs from a method of monitoring a specific degrading system of a general system type suffering from a plurality of faults.

BACKGROUND INFORMATION

A turbomachine such as a gas turbine or an internal combustion engine is a system subject to considerable loads. Creep and fatigue affect the machine in extreme conditions due to very high combustion temperatures, pressure ratios, and air flows. As a consequence of their deterioration, the main components of a gas turbine (GT), i.e. the inlet nozzle, the compressor, the combustion chamber, the turbine, the air flow cooler, and the outlet, all contribute—to a different extent—to the degradation of GT performance. The condition of each single component invariably deteriorates with operation time, until it is at least partially restored by some maintenance action.

Turbomachine degradation is a complex process that can be better understood if one clearly distinguishes between the origin and the symptoms of a fault. The initial reason of a specific degradation, in other words the origin of the fault affecting a given component, can be of various nature, such as fouling, corrosion, erosion, etc. Conversely, different faults often create similar observable effects or symptoms, such as degradation of thermodynamic efficiencies and flow capacities. Unfortunately, it is usually impossible or too expensive to measure the origin of the faults directly, and any measurement or monitoring effort is generally restricted to the identification of symptoms.

The origin of a fault affecting a given component of the gas turbine can be of various nature, such as, for example, a contamination of compressor blades, erosion of turbine blades or corrosion of machine parts. Due to its impact on the turbomachine performance, one specific type of fault origin (e.g. compressor fouling) calls for one specific maintenance action (e.g. compressor washing), while a different fault origin calls for a different maintenance action. Accordingly, there is a need to analyze the measured degradation symptoms continuously, in order to infer their root cause(s), i.e. to localize the origin of the fault(s) in progress. The result of this diagnosis may then be used to optimize the operation and maintenance strategy. Such an optimized maintenance schedule ensures economic and safe operation, and assists in predicting the remaining life of the major components. At this point, the main problem consists in going from the (observed) symptoms back to the origin of the faults. This is a kind of "inverse problem", as in reality, faults in diverse locations of the machine cause symptoms to appear, wherein as mentioned above, different faults often create similar observable effects or degradation symptoms.

In the patent application EP-A 1 418 481 a framework for aero gas turbine diagnosis is proposed which distinguishes between rapid deterioration due to singular system fault events and gradual deterioration due to damage accumulation of all engine components. A measurement $\Delta$ vector, comprising deviations from a reference of some gas path parameter data such as rotor speed, temperatures and pressures, reflects the effects of a multitude of possible engine/sensor system fault occurrences as well as random measurement noise. From this measurement $\Delta$ vector at a discrete time k, a total fault vector $x_k$ comprising the engine system and sensor faults as the current states is estimated within a Module Performance Analysis. Apart from a reference to statistical tests or neural networks, the estimation method is not detailed. If a rapid deterioration event is in progress, single fault or root cause isolation is performed, based on the change $\Delta\Delta_k$ in the measurement $\Delta$ vector w. r. t. the previous measurement at time k−1. Otherwise, multiple fault isolation is performed to yield an updated error vector, based on the cumulative share $Z_k^{MFI}$ of the measurement $\Delta$ vector assigned to gradual deterioration. Because the "fault" vector $x_k$ actually corresponds to symptoms (like reduction of fan efficiency etc.), this method allows to reconstruct and distinguish between the different symptoms; however it does not yield the faults' origin.

The goal of gas turbine performance diagnosis is to accurately detect, isolate and assess performance changes, system malfunctions and instrumentation problems. Among a number of other techniques, Gas Path Analysis (GPA) is a well established framework for estimating shifts in performance from the knowledge of measured parameters, such as power, engine speeds, temperatures, pressures or fuel flow, taken along the gas path of the turbine. Discernable shifts in these measured parameters provide the requisite information for determining the underlying shift in engine operation from a presumed reference, nominal or initial state, i.e. the degradation symptoms. GPA allows engine performance deterioration to be identified in terms of a degradation of independent parameters or system states such as thermodynamic efficiencies, flow capacities and inlet/outlet filter areas. The unpublished European Patent Application 05405270.9 discloses a method of monitoring the evolution of different degradation symptoms or health parameters representing a slowly degrading real or simulated system. This application is incorporated herein for all purposes by way of reference. All GPA-based methods essentially end up at this point, providing some estimates of the performance deteriorations or degradations i.e., of the symptoms. However, the problem of identifying and localizing the root cause of the symptoms, e.g. the answer to the question: "is the efficiency deterioration caused by turbine erosion or by fouling?", is not provided by these methods and left to a subsequent analysis or diagnosis step.

On the other hand, the patent application EP 1 103 926 relates to model-based diagnostics for aeronautical gas turbine engines. Sensor values (speed, temperatures, pressures) and virtual or model parameters (stall margins, specific fuel consumption, airflows, fan/compressor/turbine efficiencies) are evaluated in a fault detection & isolation classifier (a feed-forward neural network or a linear regressor), to identify specific fault classes and output a diagnosis. The neural network and the linear regressor are trained with sets of engine or model data, including both simulated unfaulted engines and simulated engines with the specific faults to be classified in the diagnosis.

SUMMARY

Exemplary embodiments disclosed herein can establish a link between different degradation symptoms and fault origins of a slowly degrading system, and to indicate a way of isolating a fault origin in view of an improved maintenance scheduling. A method of, and a computer program for, monitoring a specific degrading real or simulated system are disclosed.

A method of monitoring a specific degrading system of a general system type suffering from a plurality of faults ($F_i$) is disclosed, comprising: a) providing, for each fault ($F_i$), a propagation parameter ($\tau_i$) characteristic of the system type; b) providing, for each fault ($F_i$), a distribution of symptom values ($p(\delta|F_i)$, $p(\delta|\overline{F})$) characteristic of the system type; c) providing operation and maintenance data ($t_{maint}$) of the specific system; d) calculating, for each fault ($F_i$) and based on the propagation parameter ($\tau_i$) from step a) and the operation and maintenance data ($t_{maint}$) from step c), a pre-symptom fault probability ($P(F_i)$) of the specific system; and e) computing, for each fault ($F_i$) and based on the distribution of symptom values ($p(\delta|F_i)$, $p(\delta|\overline{F})$) from step b) and the pre-symptom fault probability ($P(F_i)$) from step d), a symptom-conditional fault probability $P(F_i|\delta)$ of the specific system.

A computer program for monitoring a specific degrading system of a general system type suffering from a plurality of faults ($F_i$) is disclosed, the computer program comprising computer program code means to make, when the computer program is loaded in an internal memory of a digital computer, and based on for each fault ($F_i$), a propagation parameter ($\tau_i$) characteristic of the system type, for each fault ($F_i$), a distribution of symptom values ($p(\delta|F_i)$, $p(\delta|\overline{F})$) characteristic of the system type, and operation and maintenance data ($t_{maint}$) of the specific system (2), said computer execute, the step of calculating, for each fault ($F_i$) and based on the propagation parameter ($\tau_i$,) and the operation and maintenance data ($t_{maint}$), a pre-symptom fault probability ($P(F_i)$) of the specific system, and the step of computing, for each fault ($F_i$) and based on the distribution of symptom values ($p(\delta|F_i)$, $p(\delta|\overline{F})$) and the pre-symptom fault probability ($P(F_i)$), a symptom-conditional fault probability $P(F_i|\delta)$ of the specific system.

A method of identification of a fault origin of a slowly degrading system based on initial parameter values is disclosed. The method comprises the steps of: for each potential fault relating to at least one of a contamination of compressor blades, erosion of turbine blades or corrosion of machine parts, a pre-symptom fault probability, characteristic of the specific gas turbine considered, and a symptom-conditional fault probability are calculated; on-line data from one or more monitoring device is loaded in order to update information about symptoms relating to at least one of reductions in polytropic efficiency and in flow capacity, changes in vibration spectrum, and other machine condition indicators, and a post-symptom fault probability is calculated; and the calculated fault probabilities are displayed and transmitted to a planning system for scheduling of gas turbine operation or maintenance actions.

BRIEF DESCRIPTION OF THE DRAWINGS

The subject matter of the disclosure will be explained in more detail in the following text with reference to exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
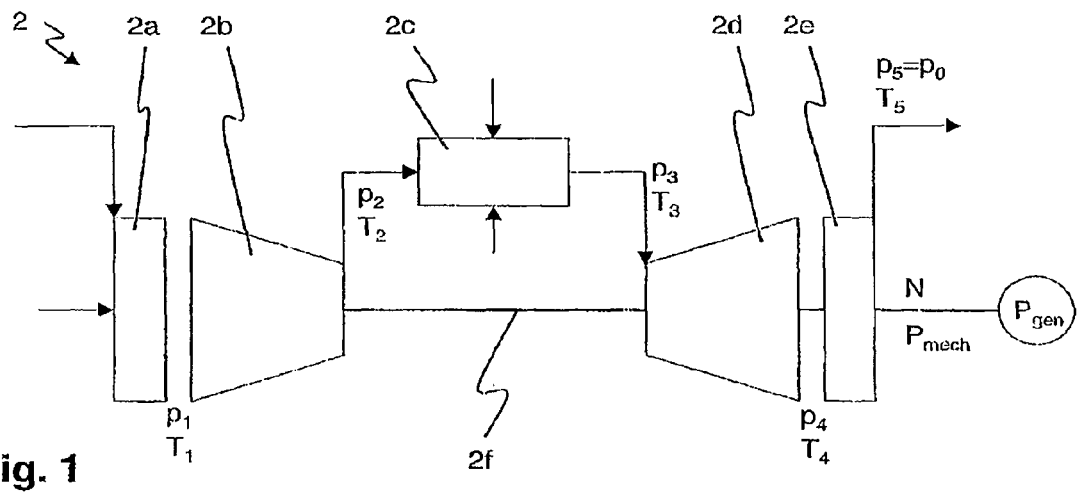
FIG. 1 schematically shows the components of an exemplary gas turbine.

According to the disclosure, data characteristic of a specific degrading system under consideration and parameters characteristic of a type or family to which the specific system belongs, are provided initially. Following this, a number of steps are repeated periodically during the operation of the specific system, at each time probabilistically relating the potential fault origins of the specific system, such as e.g. a contamination, erosion or corrosion of machine parts, to observable symptoms of the specific system, such as e.g. reductions in a polytropic efficiency or flow capacity, or changes in a vibration spectrum. In other words, the conditional probabilities of the potential origins of the system faults are computed, given the observable symptoms as well as prior information typical for the system type. In more detail, for each potential fault a pre-symptom fault probability and a symptom-conditional fault probability, both characteristic of the specific system, are consecutively calculated. The conditional probabilities quantify how likely is each one of a number of fault origins, thereby providing crucial input to risk-based planning of machine operation and maintenance. In particular, by comparing with observed symptoms of the specific degrading system at a certain time step, the most likely fault origin(s) for the degradation can then be easily diagnosed or localized.

An exemplary embodiment of the disclosure comprises a second step, according to which information about symptoms of the specific system are updated by providing a distribution of symptoms as a function of measurable dependent output variables. Based on this, a post-symptom fault probability or fault probability conditional on the measurements is calculated.

A further exemplary embodiment of the present disclosure comprises a third step, in which the calculated fault probabilities are displayed for visually diagnosing fault origins, and/or transmitted to a planning system for scheduling of operational actions for or maintenance interventions on the specific degrading system.

The slowly degrading system can be an industrial gas turbine that operates in a steady state for long periods of time. Correspondingly, with the exception of some rare transient phases between two distinct operating points, the temperature sensors are in thermodynamic equilibrium with the gaseous media and produce trustful measurement values. In addition, the average update interval between two successive time steps can be chosen quite long without approaching the characteristic degradation times of the turbine.

The present disclosure can be beneficially applied to a multitude of slowly degrading systems such as all kinds of turbomachines and internal combustion engines subject to ageing, frictional wear, contamination by deposits or the like. The following detailed description will concentrate on industrial gas turbines. Industrial gas turbines are particularly suited for the proposed diagnosis of symptoms because, unlike e.g. aero gas turbines, they are immobile and operate in a steady state for long periods of time. Therefore, neither abruptly changing ambient parameters as experienced by moving turbines, nor imbalanced exhaust parameters following an acceleration phase, are generally to be expected in the case of industrial gas turbines.

FIG. 1 shows the principal components of a gas turbine 2, viewed as a system which consists of a sequence of ideal volume elements in thermodynamic equilibrium, i.e. compressor inlet 2a (filter, nozzle), compressor 2b, combustion chamber 2c, turbine 2d and outlet conduit 2e, wherein compressor 2b and turbine 2d are mechanically interconnected by a shaft 2f. FIG. 1 also depicts the places where the various dependent or system output variables y, i.e. the process variables such as temperatures, pressures, power and shaft speed, are measured. These variables comprise the compressor inlet and outlet temperature and pressure denoted $T_1$, $p_1$ and $T_2$, $p_2$, respectively. Further along the gas path, turbine inlet and outlet temperature and pressure are denoted $T_3$, $p_3$ and $T_4$, $p_4$, respectively, whereas the exhaust gas finally has a variable temperature $T_5$ and a pressure $p_5$ assumed equal to the ambient pressure $p_0$. In addition, the shaft speed N, mechanical power $P_{mech}$ and generator power $P_{gen}$ are typical output variables y.

The health or degradation of the compressor or the turbine is usually described by a polytropic efficiency $\eta_\infty$ and a flow capacity $m\sqrt{T_{IN}}/p_{IN}$, where m is the flow and $T_{IN}$ and $p_{IN}$ are the inlet temperature and pressure of the compressor or the turbine, respectively. Accordingly, common equipment faults of a gas turbine may be represented by deviations of so-called health parameters from the values of a new-and-clean state. However, the four basic health parameters considered here, i.e. compressor flow capacity, polytropic compressor efficiency, turbine flow capacity, and polytropic turbine efficiency, cannot be measured directly during operation of the real plant; they are "hidden" symptoms that have to be derived or reconstructed from the overall plant measurements.

Following the initial input of some parameter values as detailed further below, an exemplary procedure comprises a number of steps which are repeated periodically during the operation of the gas turbine. First, for each potential fault such as e.g. a contamination of compressor blades, erosion of turbine blades or corrosion of machine parts, a pre-symptom fault probability, characteristic of the specific gas turbine considered, and a symptom-conditional fault probability are calculated. In a second step, on-line data from the monitoring devices are loaded in order to update information about symptoms such as e.g. reductions in polytropic efficiency and in flow capacity, changes in vibration spectrum, or other machine condition indicators, and a post-symptom fault probability is calculated. In a third step, the calculated fault probabilities are displayed and transmitted to a planning system for scheduling of gas turbine operation or maintenance actions.

Figure 2:
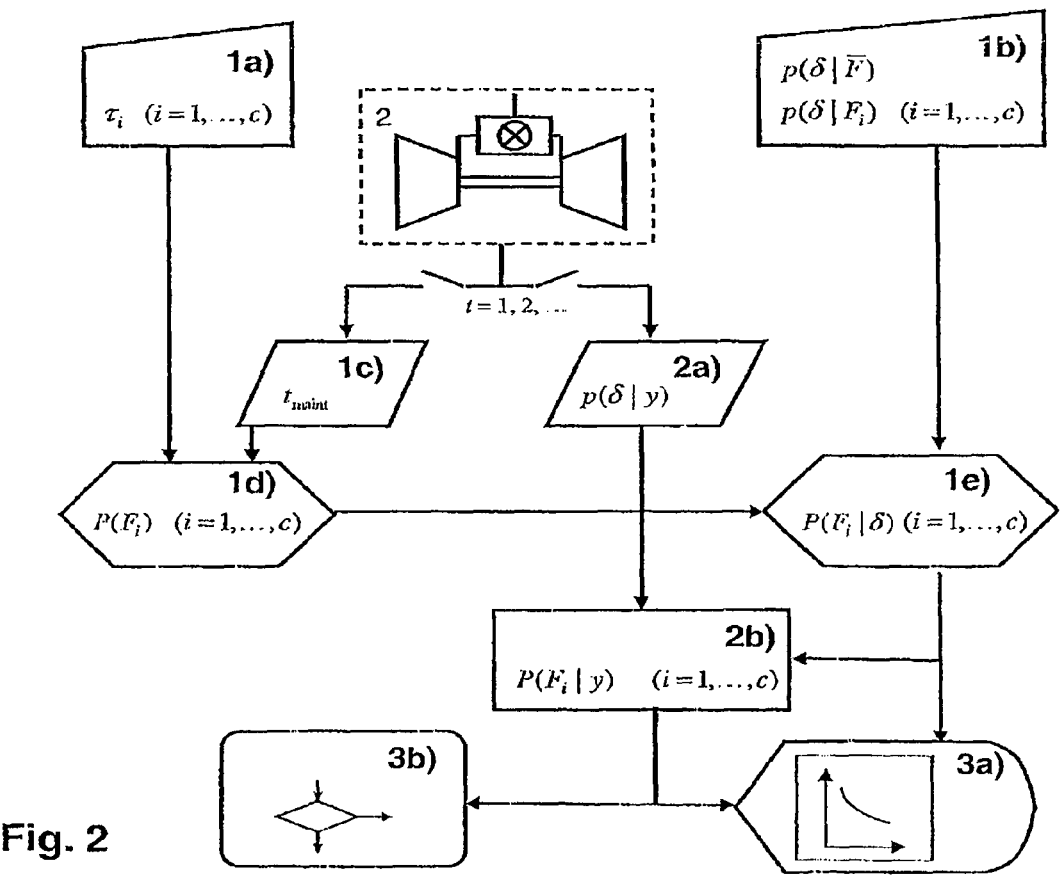
FIG. 2 is an exemplary flow chart of the process of monitoring a specific degrading system.

FIG. 2 depicts a flow chart of an exemplary process including the aforementioned steps. In the following more detailed explanations, c denotes the number of potential faults of the type of gas turbine to which a specific gas turbine under consideration belongs, $F_i$ (i=1, . . . , c) the i-th fault, $\delta$ the set of symptoms (e.g. performance degradations), where each individual symptom of the set $\delta$ generally comprises a continuous range of symptom values, and t=1, 2, . . . the discrete sampling times.

In the first step, the parameter inputs are initialized once for each potential fault $F_i$ (i=1, . . . , c). This includes, in step 1a), the indication of a propagation parameter for each fault, i.e. a nominal degradation rate, or a time constant $\tau_i$, such as a Mean Time Between Failures (MTBF) characteristic of the type of gas turbine considered. These propagation parameters can generally be determined by exploiting statistical information from a population of similar gas turbines, i.e. gas turbines of the same type and age. In step 1b), a distribution $p(\delta|F_i)$ of the values of the degradation symptoms $\delta$ caused by the fault $F_i$, i.e. the probability distribution of the symptom values in case a particular fault $F_i$ actually has occurred, is specified. The parameters of such a distribution, e.g. mean and covariance of a multivariate Gaussian distribution, can be derived from a population of similar gas turbines and the values of the degradation symptoms observed at the times of occurrence of the particular fault $F_i$. As a complementary information, the distribution of the values of the degradation symptoms $\delta$ in case of no fault, i.e. $p(\delta|\overline{F})$, is also specified. Obviously, the parameter inputs mentioned can be changed or updated subsequent to their initialization, e.g. if components have been exchanged after a machine revision.

Contrary thereto, operation and maintenance data is input and/or updated at each sampling time t=1, 2, . . . in step 1c). This data from the specific gas turbine under consideration comprises indications about a geographical location, ambient conditions and other operation data, as well as maintenance timers $t_{maint}$ indicating the time that has past since the last major maintenance or overhaul action. In step 1d), this information, together with the propagation parameters, is used to compute a pre-symptom fault probability $P(F_i)$ indicating a fault probability of the specific gas turbine, but without, or prior to, taking into account any knowledge about observed symptoms caused by the faults. One possibility of doing so is the standard exponential lifetime model based on the nominal fault propagation parameters and the timers:

$$P(F_i)=1-\exp[-(t-t_{maint})/\tau_i].$$

Just like the collection of the operation and maintenance data, this computation is updated at each sampling time, for each type of fault $F_i$. In step 1e) finally, a fault probability $P(F_i|\delta)$ given the symptoms is calculated, based on the results from steps 1b) and 1d). This symptom-conditional fault probability $P(F_i|\delta)$ for a particular fault $F_i$ as a function of the symptom values $\delta$ is computed from the quantities $P(F_i)$, $p(\delta|F_i)$, $p(\delta|\overline{F})$ as $$P(F_i|\delta) = \frac{P(F_i)p(\delta|F_i)}{P(F_i)p(\delta|F_i)+(1-P(F_i))p(\delta|\overline{F})}.$$

The symptom-conditional fault probability $P(F_i|\delta)$ is per se an important result because it represents, by virtue of the propagation parameters, an update of the information available about a present state of the gas turbine. In particular if suitably displayed as detailed below, these results can be compared with actual, updated symptoms and allow an operator of the gas turbine to diagnose fault origins and evaluate the necessity for remedial actions.

According to step 2a), additional on-line data from the specific gas turbine under consideration, such as a distribution $p(\delta|y)$ of the symptoms $\delta$ given measurements of dependent output variables y is provided, and can be updated at regular intervals. As mentioned above, the variables y comprise, for example, pressures, mass flows and temperatures at various points in the gas path of the gas turbine, a fuel mass flow, a rotational speed and an output mechanical power. Alternative data for y can be obtained from a vibration analysis of the gas turbine, or via a gas path performance monitoring as detailed above. The provided distribution of turbine-specific symptoms $p(\delta|y)$ is then merged in step 2b) with the symptom-conditional fault probability $P(F_i|\delta)$ from step 1e), to yield a post-symptom fault probability $P(F_i|y)$ that is taking into account observations of the measurement y. This post-symptom fault probability $P(F_i|y)$ is the link between the fault $F_i$ and the measurements y of output variables along the gas path, and can be computed by approximating numerically the integral $$P(F_i|y)=\int P(F_i|\delta)p(\delta|y)d\delta.$$

Again, this calculation is updated at each sampling time t=1, 2, . . . , i.e. whenever an update of the turbine-specific parameters and distributions is generated.

Figure 3:
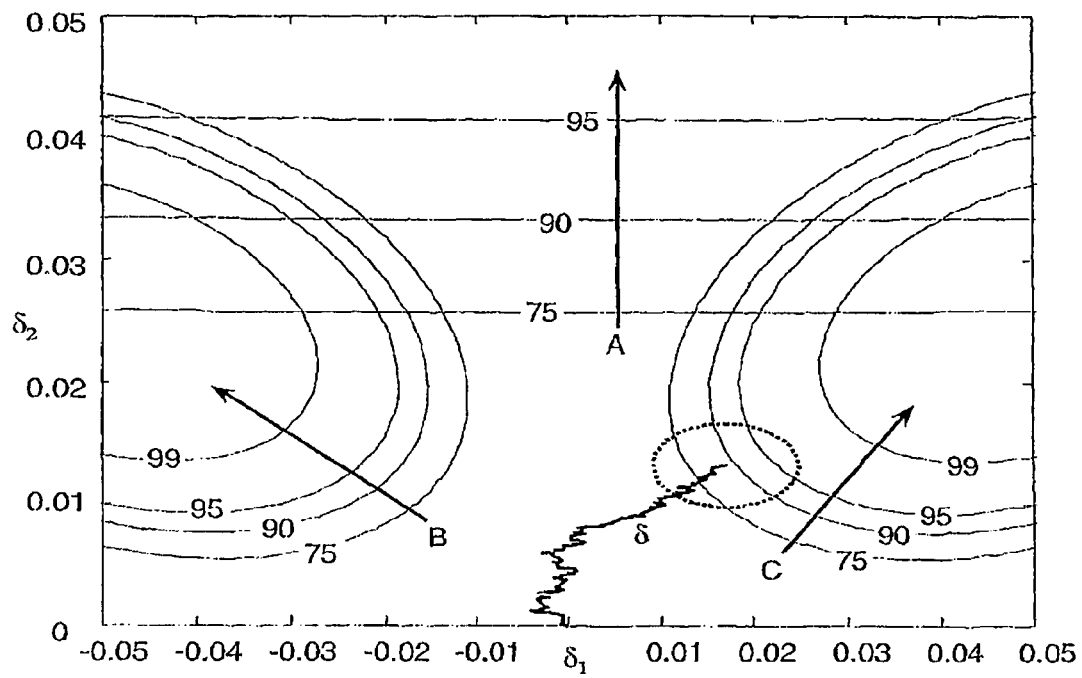
FIG. 3 is an exemplary symptom map with a contour plot of fault probabilities.

In order to assist the operators of the gas turbine in their tasks, the abovementioned results are output or displayed, e.g., in the form of a symptom map with fault critical regions, or as a trend plot, in step 3a). An example is shown in FIG. 3, depicting, as an outcome of step 1e), a symptom map with, for each fault, the symptom-conditional fault probability $P(F_i|\delta)$ as a function of two symptom variables. In FIG. 3, the symptoms "flow capacity" $\delta_1$ and "efficiency" $\delta_2$ of a turbine have been chosen, their respective deviations from a nominal state are reported on the x- and y-axis. The probability $P(F_i|\delta)$ for the three faults (A) turbine foreign object damage, (B) turbine erosion and (C) turbine fouling have been calculated, wherein different areas of the map have predominantly one single fault as indicated. For each fault $F_i$, the "altitude" $P(F_i|\delta)$ varies between 0 (the fault has 0% probability) and 100 (the fault has 100% probability) and can be visualized e.g. with contour lines (as in FIG. 3) or with continuously varying colours, thereby displaying "cold" and "hot" areas easily understandable by human operators. The measured evolution of the gas turbine symptoms can then be plotted on said symptom map, c.f. the irregular line in FIG. 3, indicating that the state of the turbine invariably has moved towards the turbine fouling (C) critical fault area during the past months.

Figure 4:
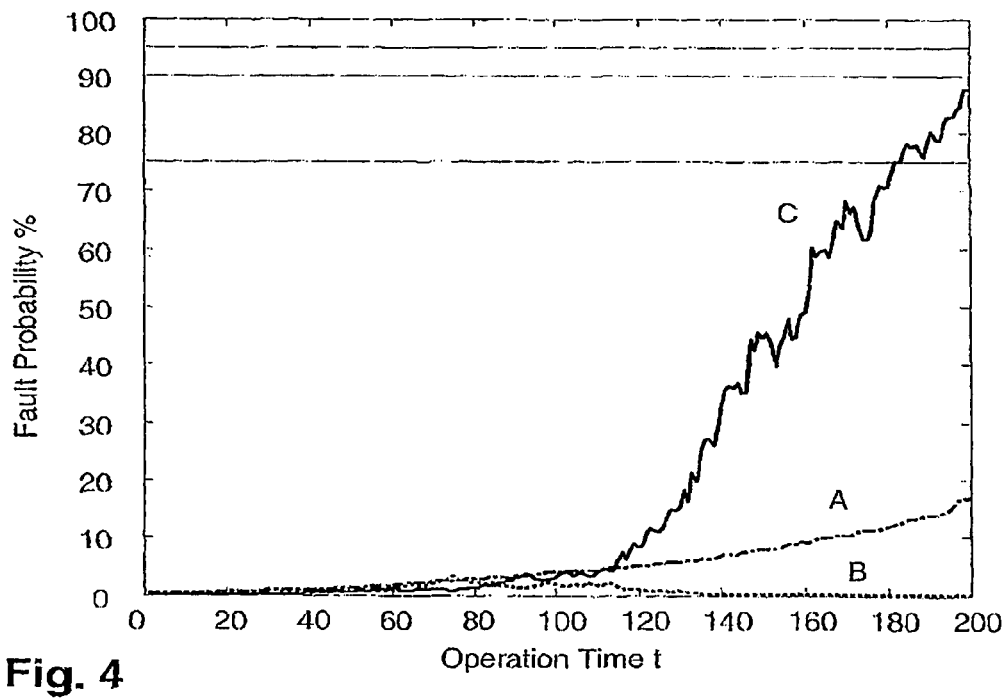
FIG. 4 is an exemplary trend-plot of fault probabilities.

A post-symptom fault probability $P(F_i|y(t))$ as calculated in step 2b) can be visualized as a trend plot, i.e. as a function of time via the time dependence of the measurements y(t). This is depicted in FIG. 4, with a fault probability for the three abovementioned fault types A, B, C being recorded over a period of several months. On the other hand, the resulting fault probabilities can also be output or forwarded to an operation or maintenance scheduling system in step 3b) as important elements for decision support.

The repeated execution of the abovementioned update process at the discrete sampling times t=1, 2, . . . , is based on the assumption that an adequate update interval or time delay between two successive executions being well below the characteristic deterioration times $\tau_i$ prevents excessive shifts in the symptom values $\delta$. In the case of gas turbines, the expected degradation rates of the health parameters are of the order of weeks or months, such that a time delay of the order of minutes appears to be adequate.

Most conveniently, the distribution of symptoms $p(\delta|y)$ of the specific system under consideration is obtained following a procedure as disclosed in the abovementioned European Patent Application 05405270.9. Accordingly, an approximation of a true health or independent parameter vector at time step k uses the approximation of the true health or parameter vector at a previous time step k−1 as a starting value for the production of a predicted or simulated health parameter vector at time step k. Based on the predicted health parameters and a set of measured values of input variables of an extended model of the system, a prediction of output variables of the model is produced. This predicted model output is compared with measured values of the output variables to yield an error. From this error, a health parameter estimator in turn produces a health parameter estimate as a revision of the predicted health parameters.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| LIST OF DESIGNATIONS | |
| --- | --- |
| 2 | gas turbine |
| 2a | inlet |
| 2b | compressor |
| 2c | combustion chamber |
| 2d | turbine |
| 2e | outlet conduit |
| 2f | shaft |

What is claimed is:

1. A method for monitoring a degradable system, suffering from a plurality of faults ($F_i$), comprising:
   a) providing, for each fault ($F_i$), a propagation parameter ($\tau_i$) characteristic of a system type, wherein the propagation parameter ($\tau_i$) is a degradation rate or a time constant;
   b) providing, for each fault ($F_i$), a distribution of symptom values ($p(\delta|F_i)$, $p(\delta|\overline{F})$) characteristic of the system type;
   c) providing operation and maintenance data ($t_{maint}$) of the system wherein the maintenance data ($t_{maint}$) comprises a time since a prior maintenance or overhaul action;
   d) calculating, by a digital computing device, for each fault ($F_i$) and based on the propagation parameter ($\tau_i$) from step a) and the operation and maintenance data ($t_{maint}$) from step c), a pre-symptom fault probability ($P(F_i)$) of the system; and
   e) computing, by the digital computing device, for each fault ($F_i$) and based on the distribution of symptom values ($p(\delta|F_i)$, $p(\delta|\overline{F})$) from step b) and the pre-symptom fault probability ($P(F_i)$) from step d), a symptom-conditional fault probability $P(F_i|\delta)$ of the system.

2. The method according to claim 1, comprising:
   a) providing a distribution of symptoms $p(\delta|y)$ of the system; and
   b) computing, for each fault ($F_i$) and based on the distribution of symptoms $p(\delta|y)$ from step 2a) and the symptom-conditional fault probability $P(F_i|\delta)$ from step 1e), a post-symptom fault probability $P(F_i|y)$.

3. The method according to claim 2, comprising:
   displaying the symptom-conditional fault probability $P(F_i|\delta)$ and the post-symptom fault probability $P(F_i|y)$ of the system to an operator.

4. The method according to claim 2, comprising:
   forwarding the post-symptom fault probability $P(F_i|y)$ to a scheduling system.

5. The method according to claim 1, comprising:
   displaying the symptom-conditional fault probability $P(F_i|\delta)$ and the post-symptom fault probability $P(F_i|y)$ of the system to an operator.

6. The method according to claim 1, wherein steps 1d) and 1e) are repeated at discrete sampling times t=1, 2, . . . , separated by an update interval significantly smaller than a degradation time $\tau$ characteristic of the system type.

7. The method according to claim 6, wherein the system is an industrial gas turbine.

8. The method according to claim 1, wherein the system is an industrial gas turbine.

9. The method according to claim 1, comprising:

forwarding the post-symptom fault probability $P(F_i|y)$ to a scheduling system.

10. A non-transitory computer readable medium storing a computer program for monitoring a degradable system, suffering from a plurality of faults ($F_i$), the computer program comprising:

for each fault ($F_i$), a propagation parameter ($\tau_i$) characteristic of the system type, wherein the propagation parameter ($\tau_i$) is a degradation rate or a time constant, for each fault ($F_i$), a distribution of symptom values ($p(\delta|F_i)$, $p(\delta|\overline{F})$) characteristic of the system type, and operation and maintenance data ($t_{maint}$) of the system, wherein the maintenance data ($t_{maint}$) comprises a time since a prior maintenance or overhaul action, said computer program causing said digital computer to calculate, for each fault ($F_i$) and based on the propagation parameter ($\tau_i$) and the operation and maintenance data ($t_{maint}$), a pre-symptom fault probability ($P(F_i)$) of the system, and computing, for each fault ($F_i$) and based on the distribution of symptom values ($p(\delta|F_i)$, $p(\delta|\overline{F})$) and the pre-symptom fault probability ($P(F_i)$), a symptom-conditional fault probability $P(F_i|\delta)$ of the system.

* * * * *